(12) United States Patent
Im et al.

(10) Patent No.: US 12,384,284 B2
(45) Date of Patent: Aug. 12, 2025

(54) SEPARATELY MOVABLE CONSOLE STRUCTURE

(71) Applicants: HYUNDAI MOTOR COMPANY, Seoul (KR); KIA CORPORATION, Seoul (KR); DAS CO., LTD, Gyeongju-si (KR); ECOPLASTIC CORPORATION, Gyeongju-si (KR)

(72) Inventors: Yoon Im, Suwon-si (KR); Dae Ig Jung, Suwon-si (KR); Eun Sue Kim, Hwaseong-si (KR); Joo Hwa Kim, Hwaseong-si (KR); In Ho Jo, Suwon-si (KR); Hae Ju Park, Ulsan (KR)

(73) Assignees: HYUNDAI MOTOR COMPANY, Seoul (KR); KIA CORPORATION, Seoul (KR); DAS CO., LTD, Gyeongju-si (KR); ECOPLASTIC CORPORATION, Gyeongju-si (KR)

(*) Notice: Subject to any disclaimer, the term of this patent is extended or adjusted under 35 U.S.C. 154(b) by 448 days.

(21) Appl. No.: 18/077,055

(22) Filed: Dec. 7, 2022

(65) Prior Publication Data
US 2023/0226962 A1 Jul. 20, 2023

(30) Foreign Application Priority Data
Jan. 19, 2022 (KR) .................. 10-2022-0007645

(51) Int. Cl.
*B60N 3/00* (2006.01)
*B60N 2/14* (2006.01)
*B60N 2/75* (2018.01)

(52) U.S. Cl.
CPC ............. *B60N 3/001* (2013.01); *B60N 2/143* (2013.01); *B60N 2/797* (2018.02)

(58) Field of Classification Search
CPC ........ B60N 3/001; B60N 2/143; B60N 2/797; B60N 2/14; B60N 3/002; B60R 7/06; B60R 2011/0084; B60R 2011/0092
See application file for complete search history.

(56) References Cited

U.S. PATENT DOCUMENTS

| 7,416,235 B2 * | 8/2008 | Rajappa | .................... B60R 7/04 296/37.8 |
| 10,946,802 B2 * | 3/2021 | Harris | ..................... F16H 19/04 |

(Continued)

FOREIGN PATENT DOCUMENTS

| JP | 2008155661 A | * | 7/2008 |
| JP | 2017165198 A | | 9/2017 |

(Continued)

*Primary Examiner* — Peter D Nolan
*Assistant Examiner* — Anwar Mohamed
(74) *Attorney, Agent, or Firm* — Lempia Summerfield Katz LLC (57) ABSTRACT

Proposed is a separately movable console structure including a first console positioned underneath an armrest cover and configured to move along a console rail, an insertion portion being formed inside the first console, and a second console positioned behind the first console and configured to move along the console rail. In particular, a protrusion is formed on the second console to be inserted into the insertion portion. The separately movable console structure further includes: a first drive unit fastened to the console rail and configured to apply a driving force to the first console, a second drive unit positioned adjacent to the first drive unit and configured to apply a driving force to the second console, and a controller connected to the first console and configured to move the first and second consoles independently of each other or to move the first and second consoles together with each other.

10 Claims, 4 Drawing Sheets

(56) References Cited

U.S. PATENT DOCUMENTS

| | | | |
|---|---|---|---|
| 2021/0009042 A1* | 1/2021 | Lee | B60R 7/04 |
| 2021/0086699 A1* | 3/2021 | Chen | B60R 7/04 |
| 2024/0208372 A1* | 6/2024 | Herrmann | B60N 2/0277 |

FOREIGN PATENT DOCUMENTS

| | | | |
|---|---|---|---|
| JP | 2019077319 A | 5/2019 | |
| JP | 2020117138 A | 8/2020 | |
| KR | 101865763 B1 | 6/2018 | |

\* cited by examiner

SEPARATELY MOVABLE CONSOLE STRUCTURE

CROSS-REFERENCE TO RELATED APPLICATION

This application claims under 35 U.S.C. § 119(a) the benefit of and priority to Korean Patent Application No. 10-2022-0007645, filed on Jan. 19, 2022, the entire contents of which are incorporated herein by reference.

BACKGROUND

(a) Technical Field

The present disclosure relates to a separately movable-console structure and, more particularly, to a separately movable-console structure having a first console and a second console which are capable of being separately used according to a mode in use or for user convenience.

(b) Background Art

As is well known, a vehicle console is fixedly mounted between a driver's seat and a seat adjacent to the driver's seat and is used to accommodate various things. An armrest on which a driver and a passenger rest their arms is mounted on the top of the console in a manner that is openable or closable.

However, such a console in the related art occupies a large portion of an in-vehicle space. The console employs a single box structure having an accommodation space and is fixedly mounted on a floor panel. Thus, the console has a disadvantage in that the spatial utility and functional utility of the console are low and that a passenger sitting on a rear seat cannot easily use the console.

Furthermore, because an engine, a drive shaft, and the like will not be used for autonomous driving electric vehicles, a flat type of in-vehicle floor panel will be used in future years. Accordingly, a mechanism can be employed by which a seat on which the driver and the passenger sit can be moved forward or backward or be swiveled around to reach a desired position. However, in a case where the console is fixedly mounted on the floor panel, the console is moved farther away from the seat when the seat is moved forward or backward. Thus, the driver or the passenger can have difficulty using the console and the armrest.

To solve this problem, research has been conducted on various methods for manufacturing a console having a structure, such as one capable of moving the console to a position at which all the passengers on the front and rear seats can use the console and of providing various convenient functions in addition to a function of accommodating a thing.

The above information disclosed in this Background section is provided only to enhance understanding of the background of the disclosure. Accordingly, it may include information that does not form the prior art that is already known to a person of ordinary skill in the art.

SUMMARY OF THE DISCLOSURE

The present disclosure provides a separately movable console structure capable of being used in a state where a first console and a second console are combined with or separated from each other by application of a controller and a distance sensor unit.

Another object of the present disclosure is to provide a separately movable console structure capable of moving a first console and a second console according to a mode in use by connecting a controller and first and second drive units.

The present disclosure is not limited to the above-mentioned objects. Objects other than the above-mentioned objects would be clearly understood from the following description of embodiments of the present disclosure. In addition, the objects of the present disclosure will be accomplished by limitations recited in claims or a combination thereof.

In order to accomplish the above-mentioned objects of the present disclosure, a separately movable console structure is configured as follows.

According to an aspect of the present disclosure, a separately movable console structure includes: a first console positioned underneath an armrest cover, an insertion portion being formed inside the first console; and a second console positioned behind the first console. The separately movable console structure further includes a protrusion to be inserted into the insertion portion being formed on the second console. In particular, the first console is moved along a console rail and the second console is also moved along the console rail. The separately movable console structure further includes: a first drive unit configured to be fastened to the console rail and to apply a driving force to the first console; a second drive unit configured to be positioned adjacent to the first drive unit and to apply a driving force to the second console; and a controller configured to be connected to the first console and to move the first console and the second console independently of each other or to move the first console and the second console together with each other.

In the separately movable console structure, the controller may be configured to move a seat by a preset distance or longer away from the first console and the second console in a combined state, to which the seat is adjacent, in response to a user's swivel request signal.

In the separately movable console structure, the insertion portion may be configured to be opened and closed through a door portion, and the second console may be configured so that the protrusion is inserted through the door portion into the insertion portion in such a manner that the end thereof reaches a position adjacent to an internal surface of the insertion portion.

The separately movable console structure may further include a distance sensor unit configured to measure a separation distance between the end of the protrusion and the internal surface of the insertion portion. The controller may be configured to receive a distance signal from the distance sensor unit and to adjust a speed of the first console or the second console.

In the separately movable console structure, the controller may be configured to move the first console and the second console in a combined state in a case where the separation distance between the end of the protrusion and the internal surface of the insertion portion is below a first setting value.

In the separately movable console structure, the controller may be configured in such a manner that, in a case where the separation distance between the end of the protrusion and the internal surface of the insertion portion is at or above the first setting value, the controller may determine whether or not the separation distance between the end of the protrusion and the internal surface of the insertion portion is below a second setting value in a state where the first console and the second console are separated from each other. When the separation distance between the end of the protrusion and the internal surface of the insertion portion is at or above the second setting value, the controller may move the first console or the second console at a first speed. When the separation distance between the end of the protrusion and the internal surface of the insertion portion is below the second setting value, the controller may move the first console or the second console at a second speed.

In the separately movable console structure, the second console may include a pop-up table configured to be unfolded upwards when the second console have been separated from the first console and then fixed.

In the separately movable console structure, the controller may be configured to move backward the first console and the second console in a combined state when receiving a door opening signal or a user's relaxation mode input signal.

In the separately movable console structure, the controller may be configured to move the first console and the second console forward and backward, respectively, thereby spacing the first console and the second console apart, and to rotate the seat when receiving the user's swivel mode input signal.

According to the present disclosure, the following advantageous effects can be achieved according to the above-mentioned aspect of the present disclosure and with constituent elements, a combination thereof, and an application-based relationship therebetween that will be described below.

The separately movable console structure can be used in the state where the first console and the second console are combined with or separated from each other by the controller and the distance sensor unit, and thus has the advantageous effect of being usable for various applications in a limited in-vehicle space.

In addition, the separately movable console structure has the advantageous effect of being able to automatically control the first console and the second console according to a mode in use by connecting the controller and the first and second drive units.

BRIEF DESCRIPTION OF THE DRAWINGS

The above and other features of the present disclosure are described in detail with reference to certain embodiments thereof illustrated in the accompanying drawings which are given herein below by way of illustration only, and thus are not intended to limit the scope of the present disclosure, and wherein.

DETAILED DESCRIPTION

Embodiments of the present disclosure are described in more detail below with reference to the accompanying drawings. The embodiments of the present disclosure can be modified in various forms, and the scope of the present disclosure should not be interpreted as being limited to the following embodiments. The embodiments are described in sufficient detail to enable a person of ordinary skill in the art to make and use the present disclosure.

In addition, the terms "unit," and the like are used to name a constituent element in the present specification and mean a unit that performs at least one function or operation and may be realized as a combination of hardware components.

In addition, throughout the present specification, when a constituent element is "over" a different constituent element, this means that a third constituent element may be positioned therebetween, and, when a constituent element is "on the top of" a different constituent element, this means that a constituent element is vertically in contact with an upper surface of a different constituent element. Furthermore, throughout the present specification, when a constituent element is "under" a different constituent element, this means that a third component may be positioned therebetween, and, when a constituent element is "on the bottom of" a different constituent element, this means that a constituent element is vertically in contact with a lower surface of a different constituent element.

In addition, the term "top" and "bottom" used in the present specification mean upper and lower surfaces, respectively, of a constituent element in the lengthwise direction of the drawing when viewed from above.

In addition, in order to distinguish among constituent elements that have the same name, the terms first, second, and so on are used throughout the present specification. In the following description, no limitation to the order of the terms is necessarily imposed.

In addition, throughout the present specification, the "height direction," "widthwise direction," and "lengthwise direction" are defined with respect to a vehicle. When a component, device, element, or the like of the present disclosure is described as having a purpose or performing an operation, function, or the like, the component, device, or element should be considered herein as being "configured to" meet that purpose or to perform that operation or function.

Figure 1:
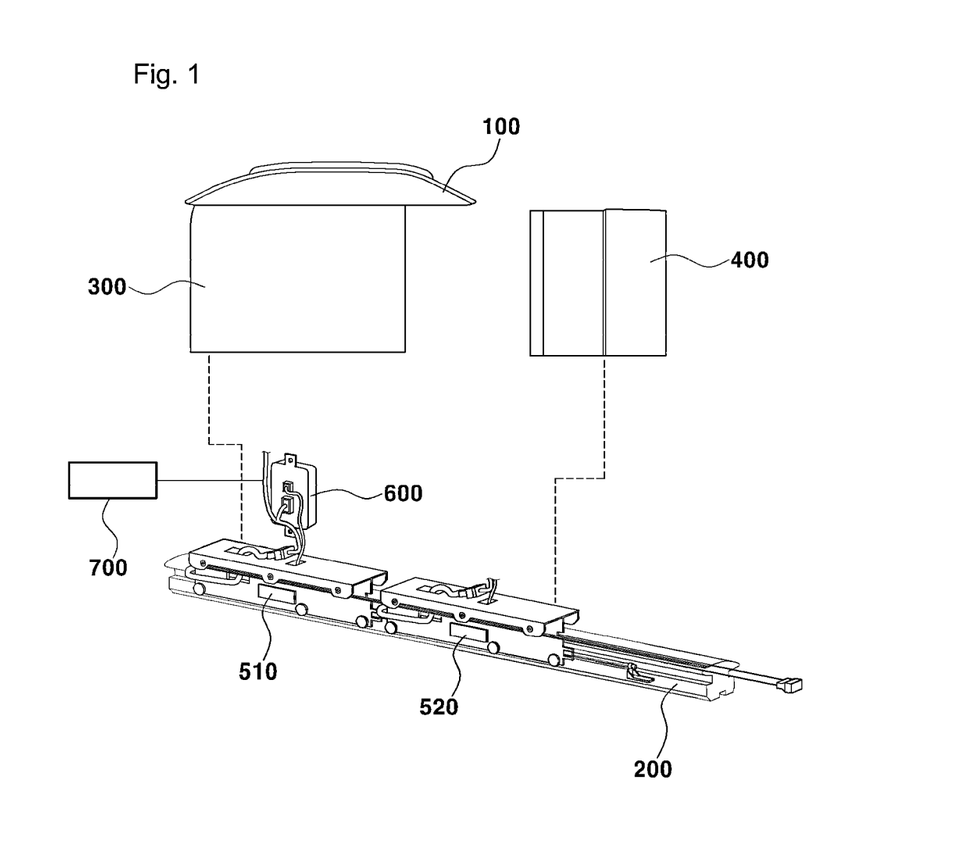
FIG. 1 is a view illustrating a configuration of a separately movable console structure as an embodiment of the present disclosure.
Figure 2:
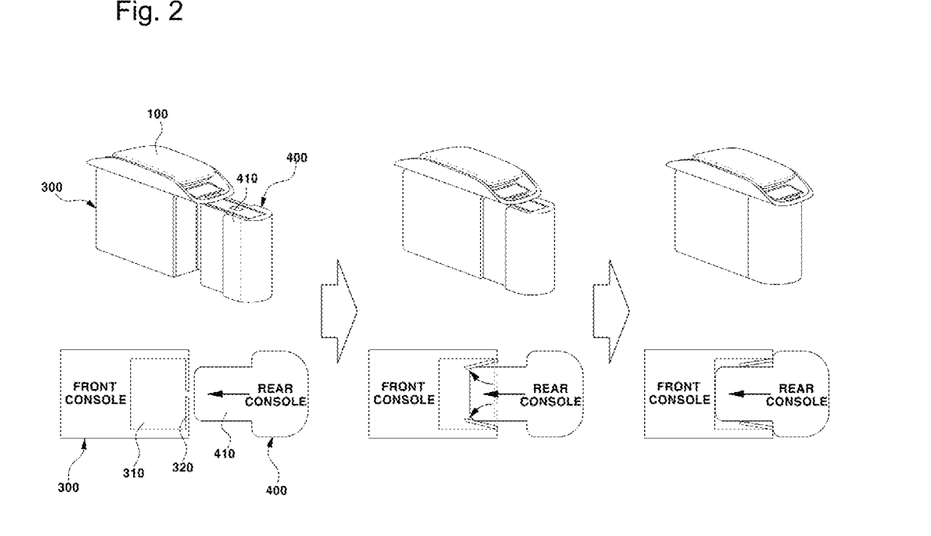
FIG. 2 is a view illustrating a process of inserting a protrusion into an insertion portion having the separately movable console structure, as an embodiment of the present disclosure.

FIG. 1 is a view illustrating a configuration of a separately movable console structure as an embodiment of the present disclosure. FIG. 2 is a view illustrating a process of inserting a protrusion into an insertion portion having the separately movable console structure, as an embodiment of the present disclosure.

With reference to FIGS. 1 and 2, a separately movable console structure according to an embodiment of the present disclosure may be configured to include a first console 300, a second console 400, a first drive unit 510, a second drive unit 520, and a controller 600.

The first console 300 may be positioned underneath an armrest cover 100. In one embodiment, the first console 300 may be configured to be moved in a lengthwise direction thereof along a console rail 200, together with the armrest cover 100 above and an internal accommodation space. The first console 300 may be configured to be moved forward or backward along the console rail 200.

In one embodiment, an insertion portion 310 may be formed inside the first console 300, and one portion of the second console 400 may be inserted into the insertion portion 310. More desirably, the first console 300 may be configured in such a manner that the insertion portion 310 is formed in an internal space other than the accommodation space.

The insertion portion 310 may be configured to be opened and closed through the door portion 320. In one embodiment, the door portion 320 may be a bi-fold door. The second console 400 may be configured so that the protrusion 410 is inserted through the door portion 320 into the insertion portion 310 in such a manner that the end thereof reaches a position adjacent to an internal surface of the insertion portion 310.

In one embodiment, when the protrusion 410 is moved forward to be inserted into the insertion portion 310, both sides of the door portion 320 are open by being rotated toward the inside of the inserting portion 310 as the end of the protrusion 410 is brought into contact with the door portion 320. The door portion 320 may be configured in such a manner that both sides the door portion 320 are rotated back to be closed when the protrusion 410 is moved backward out of the insertion portion 310.

The second console 400 may be configured to be positioned behind the first console 300. The protrusion 410, which is to be inserted into the insertion portion 310, may be formed on the second console 400. The protrusion 410 may be configured to correspond to a shape of the insertion portion 310 and thus to be inserted into the insertion portion 310 without undergoing interference therewith.

The second console 400 may be configured to be moved along the console rail 200. In one embodiment, the second console 400 may be configured to be moved forward or backward in a lengthwise direction thereof along the console rail 200.

The console rail 200 may be formed to extend in a lengthwise direction thereof. In one embodiment, the console rail 200 may be configured to extend in a lengthwise direction thereof in such a manner that the first console 300 or the second console 400 is moved forward or backward. Brackets for fastening the first console 300 and the second console 400, respectively, may be formed on the console rail 200. In addition, the console rail 200 may be configured to include the first drive unit 510 applying a driving force to the first console 300 and the second drive unit 520 applying a driving force to the second console 400. The first drive unit 510 and the second drive unit 520 may be configured to be fastened to the console rail 200. The second drive unit 520 may be positioned adjacent to the first drive unit 510. In one embodiment, the second drive unit 520 may be adjacent to the first drive unit 510 and may be fastened to the console rail 200.

In one embodiment, the console rail 200 includes the brackets and lead screw for respectively fastening the first console 300 and the second console 400, and also brushless direct current (BLDC) motors corresponding to the brackets.

The controller 600 may be configured to be connected to the first console 300. In one embodiment, the controller 600 may be configured to be connected to the first console 300 and thus to control the first drive unit 510 or the second drive unit 520. The controller 600 may be configured to move a seat 900 a preset distance or longer away from the first console 300 and the second console 400 in a combined state, to which the seat 900 is adjacent, in response to a user's swivel request signal. The controller may be controlled to move the first console and the second console independently of each other or to move the first console and the second console together with each other.

The controller 600 may be configured in such a manner that, in a case where the user's swivel request signal occurs, the controller 600 moves the seat 900 the preset distance or longer, then moves the first console 300 and the second console 400, and thus secures a rotation radius within which the seat 900 is rotatable. The controller 600 may be configured to rotate the seat 900 in a case where the rotation radius of the seat 900 is secured. In one embodiment, a central angle of a circle with the rotation radius that results when the seat 900 is rotated to a maximum angle may be 180 degrees. A configuration may be employed where the seat 900 is rotated to a user's desired angle, where the first console 300 then is moved in the lengthwise direction thereof and where a user thus can use the armrest cover 100.

The separately movable console structure according to an embodiment of the present disclosure may further include a distance sensor unit 700 connected to the controller 600. The distance sensor unit 700 may be configured to measure a separation distance between the end of the protrusion 410 and the internal surface of the insertion portion 310. The controller 600 may be configured to receive a distance signal from the distance sensor unit 700 and to adjust a speed of the first console 300 or the second console 400.

The controller 600 may be configured to receive the distance signal and to determine whether the first console 300 and the second console 400 are combined with each other. In addition, the controller 600 may be configured to receive the distance signal and to adjust a moving speed of the first console 300 or the second console 400.

The controller 600 may be configured in such a manner that, in a case where the separation distance between the end of the protrusion 410 and the internal surface of the insertion portion 310 is below a first setting value, the controller 600 determines that the first console 300 and the second console 400 are in the combined state and moves the first console 300 and the second console 400. More desirably, the controller 600 may be configured in such a manner that, when receiving a value lower than the first setting value from the distance sensor unit 700, the controller 600 moves the first console 300 and the second console 400 forward or backward in the lengthwise directions thereof in a state where the protrusion 410 is inserted into the insertion portion 310.

In a case where the separation distance between the end of the protrusion 410 and the internal surface of the insertion portion 310 is equal to or greater than the first setting value, the controller 600 may determine whether or not the separation distance between the end of the protrusion 410 and the internal surface of the insertion portion 310 is less than a second setting value in a state where the first console 300 and the second console 400 are separated from each other.

The controller 600 may be configured in such a manner that, in a case where the separation distance between the end of the protrusion 410 and the internal surface of the insertion portion 310 is equal to or greater than the second setting value, the controller 600 moves the first console 300 or the second console 400 at a first speed. Conversely, the controller 600 may be configured in such a manner that, in a case where the separation distance between the end of the protrusion 410 and the internal surface of the insertion portion 310 is less than the second setting value, the controller 600 moves the first console 300 or the second console 400 at a second speed. The first speed is at a higher value than the second speed. In one embodiment, the first speed may be 1000 rpm and the second speed may be 300 rpm.

In one embodiment, the first setting value may be 5 mm, and the second setting value may be 25 mm. When receiving a value of less than 5 mm from the distance sensor unit 700, the controller 600 may perform control in such a manner that the first console 300 and the second console 400 are moved in the combined state. When receiving a value of 5 mm or higher from the distance sensor unit 700, the controller 600 may perform control in such a manner that the first console 300 or the second console 400 is moved in a separated state. Subsequently, the controller 600 may determine whether or not a value of the distance signal received from the distance sensor unit 700 is lower than 25 mm.

The controller 600 may be configured in such a manner that, in a case where the value of the distance signal received from the distance sensor unit 700 is 25 mm or higher, the controller 600 moves the first console 300 or the second console 400 at a speed of 1000 rpm. The controller 600 may be configured in such a manner that, in a case where the value of the distance signal received from the distance sensor unit 700 is lower than 25 mm, the controller 600 decreases the speed of the first console 300 or the second console 400 to 300 rpm. Accordingly, impact that occurs when the first console 300 and the second console 400 are combined with each other can be mitigated, When receiving a value of less than 5 mm from the distance sensor unit 700, the controller 600 may determine that the first console 300 and the second console 400 are in a fully combined state. The controller 600 may be configured in such a manner that, in a case where it is determined that the first console 300 and the second console 400 are in the fully combined state, the controller 600 transmits a driving signal to the first drive unit 510 and the second drive unit 520 and thus applies the driving force to the first console 300 and the second console 400.

Figure 3:
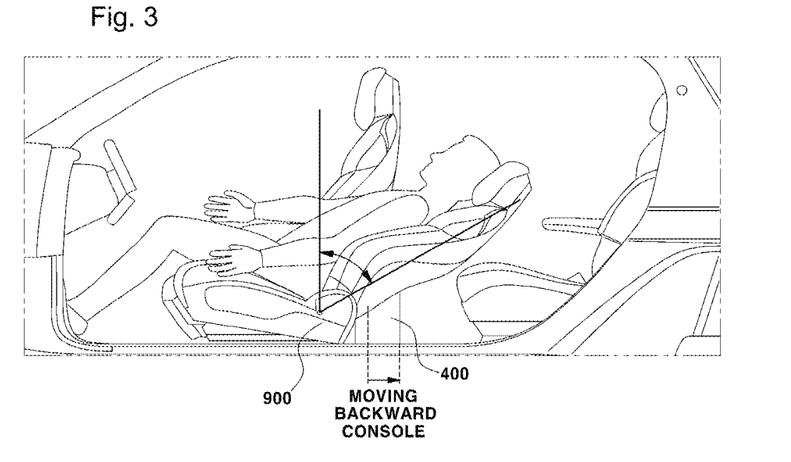
FIG. 3 is a view illustrating a relaxation mode for the separately movable console structure, as an embodiment of the present disclosure.

FIG. 3 is a view illustrating that a relaxation mode for the separately movable console structure is performed, as an embodiment of the present disclosure.

With reference to FIG. 3, the controller 600 may be configured in such a manner that, when receiving a door opening signal or a user's relaxation mode input signal, the controller 600 moves backward the first console 300 and the second console 400 in the combined state. In one embodiment, in a state where the protrusion 410 is inserted into the insertion portion 310, in response to the door opening signal or the relaxation mode input signal, the controller 600 may perform control in such a manner that the first console 300 or the second console 400 is moved forward or backward. The controller 600 may be configured to control the distance the first console 300 and the second console 400 in the combined state are moved.

In another embodiment, a driver may input the door opening signal through a smart key or a software application. The door opening signal may be a signal for a walk-through mode. The walk-through mode may mean a mode for securing a path between a driver's seat and a seat adjacent to the driver's seat. In the walk-through mode, a space through which a passenger gets on and off a vehicle can be maximized using a front seat and a rear seat.

When receiving the door opening signal, the controller 600 may insert the second console 400 into the first console 300 for being fixed thereto and thus may minimize a console volume. Subsequently, the seat 900 adjacent to the first console 300 and the second console 400 in the combined state may be moved backward. As one embodiment, the seat 900 may be moved by a distance of 50 mm backward.

Consecutively, the controller 600 may arrange the first console 300 and the second console 400 in the combined state to be positioned adjacent to the seat 900 moved backward. As a practical example, the first console 300 and second console 400 in the combined state may be moved backward by a distance of 50 mm. Accordingly, when getting on a vehicle to sit on the front seat or the rear seat and getting off the vehicle, the passenger can freely move in an in-vehicle space without undergoing interference with the first console 300 and the second console 400.

The controller 600 may be configured to move back the seat 900 and the first console 300 and the second console 400 in the combined state in the forward direction after the passenger gets on and off the vehicle. As a practical example, the seat 900 and the first console 300 and the second console 400 in the combined state are moved forward by a distance of 50 mm to return to original positions thereof.

The relaxation mode may be a mode for adjusting the seat 900 to a desired angle at which the driver feels comfortable. As a practical example, the relaxation mode input signal may be input through various buttons and switches that are mounted on the vehicle.

In one embodiment, in the relaxation mode, a state where a recliner of the seat 900 is tilted to an angle of 16 degrees, where a height of the seat 900 is adjusted, and where a seat back is rotated to an angle of 30 degrees is entered. The controller 600 may be configured in such a manner that, when receiving the relaxation mode input signal, the controller 600 moves backward the first console 300 and the second console 400 in the combined state. In another embodiment, the first console 300 and the second console 400 in the combined state may be moved backward by a distance of 140 mm.

Figure 4:
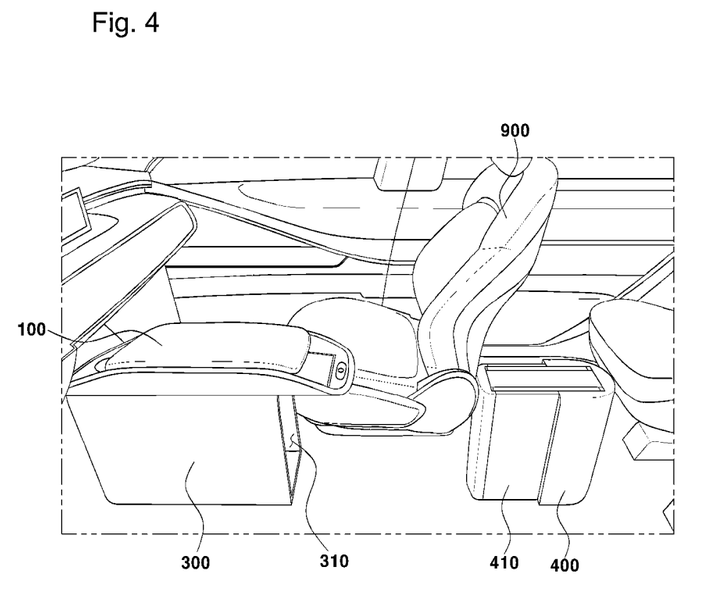
FIG. 4 is a view illustrating a state where a first console and a second console are moved in a swivel mode for the separately movable console structure, as an embodiment of the present disclosure.
Figure 5:
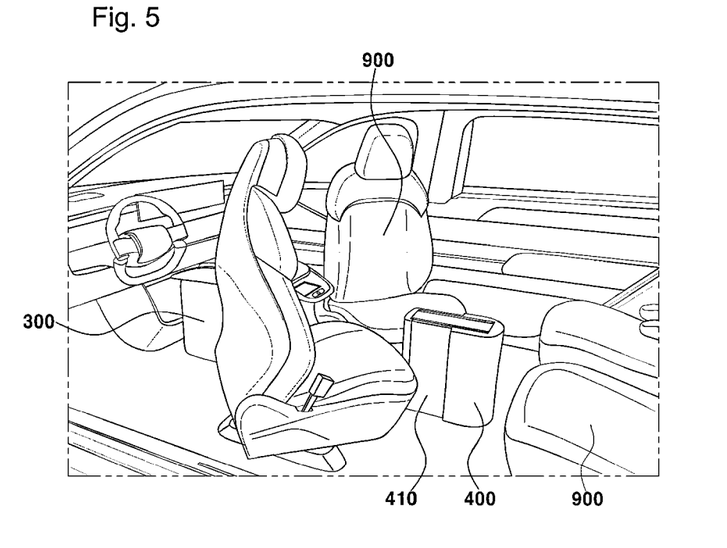
FIG. 5 is a view illustrating a state where a seat is rotated in the swivel mode for the separately movable console structure, as an embodiment of the present disclosure.

FIG. 4 is a view illustrating a state where the first console 300 and the second console 400 are moved in a swivel mode for the separately movable console structure, as an embodiment of the present disclosure. FIG. 5 is a view illustrating a state where the seat 900 is rotated in the swivel mode for the separately movable console structure, as an embodiment of the present disclosure.

With reference to FIGS. 4 and 5, the controller 600 may be configured in such a manner that, when receiving a user's swivel mode input signal, the controller 600 moves the first console 300 and the second console 400, forward and backward, respectively, thereby spacing the first console 300 and the second console 400 apart, and rotates the seat 900.

The swivel mode may refer to all cases in which a position of the seat 900 of an autonomous driving vehicle is adjusted by a forward movement, a backward movement, a swivel operation, a local swivel operation, and the like. The first console 300 or the second console 400 may be configured to be moved to a position thereof, determined by considering a user's position and ease of use, in the swivel mode.

As another embodiment, the swivel mode may be a face-to-face mode for partly swiveling around the driver's seat 900 and the seat adjacent to the driver's seat 900 for the purpose of communication and dialogue with the passenger sitting on the rear seat. In this case, there is a need to secure a path along which the driver's seat 900 or the seat adjacent to the driver's seat 900 is partly swiveled around. To this end, a separately movable console structure according to another embodiment of the present disclosure may be configured in such a manner that the first console 300 and the second console 400 are moved separately.

The swivel mode input signal may be input through a user's software application and the like. As a practical example, when receiving the swivel mode input signal, the controller 600 may move the first console 300 forward by a distance of 265 mm and may move backward the second console 400 by a distance of 450. Subsequently, the controller 600 may swivel the seat 900 around in the inward direction to an angle of 180 degrees. In a case where the seat 900 is fully swiveled around, the controller 600 may move back the first console 300 by a distance of 265 mm in the backward direction, thereby returning the first console 300 to an original position thereof. Accordingly, when performing a swiveling operation, the seat 900 may be easily rotated inward without undergoing interference with the first console 300 or the second console 400.

Figure 6:
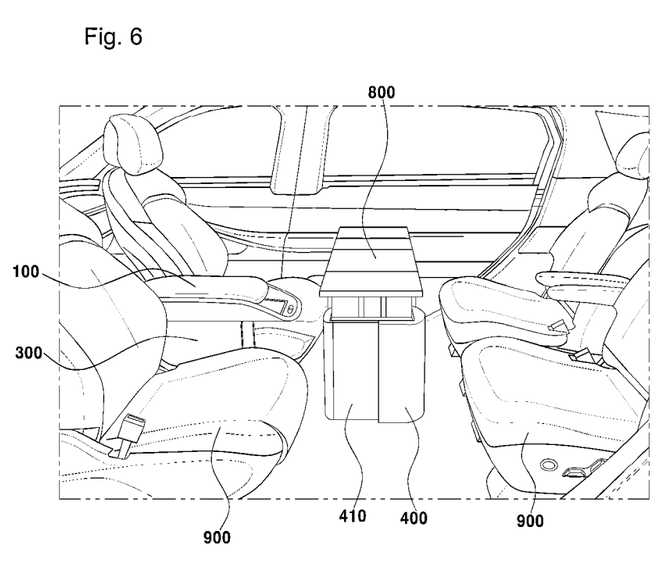
FIG. 6 is a view illustrating a pop-up table in the separately movable console structure, as an embodiment of the present disclosure.

FIG. 6 is a view illustrating a pop-up table in the separately movable console structure, as an embodiment of the present disclosure.

With reference to FIG. 6, in the separately movable console structure according to the embodiment of the present disclosure, the second console 400 may include a pop-up table 800. More desirably, the second console 400 may include a pop-up table 800 configured to be unfolded upwards when the second console 400 have been separated from the first console 300 and then fixed.

As a practical example, as illustrated in FIG. 6, the controller 600 may be configured in such a manner that in the swivel mode, the controller 600 causes the second console 400 to be securely held in a state of being moved backward in order for all passengers sitting on the front seat and the rear seat to use the second console 400 in a shared manner. More desirably, the controller 600 may be configured in such a manner that, after the seat 900 is rotated in the swivel mode, the controller 600 moves back the first console 300 in the forward direction and securely holds the second console 400 in a state of being moved backward.

The pop-up table 800 may be formed in the shape of a flat plate. The pop-up table 800 may be configured in such a manner as to protrude upward from the top of the second console 400 in a state where the second console 400 is fixedly separated from the first console 300. An opening portion through which the pop-up table 800 protrudes upward may be formed in the top of the second console 400. The second console 400 may be configured to be used together with the accommodation space below and the pop-up table 800 above.

In summary, the separately movable console structure according to the present disclosure are configured as follows. In the separately movable console structure, it is possible that by application of the controller 600 and the distance sensor unit 700, the first console 300 and the second console 400 are used separately from each other according to a mode in use or for user convenience. Furthermore, it is also possible that the controller 600 and the first and second drive units 510 and 520 are connected to each other and thus that the first console 300 and the second console 400 are moved according to the mode in use.

The embodiments of the present disclosure are described above in an exemplary manner. In addition, the embodiments of the present disclosure are described above as desired embodiments, and different modifications to the embodiments of the present disclosure and various different combinations thereof would be made under various conditions. A modification or alteration to the embodiments, as disclosed in the present specification, of the present disclosure would be made within the scope of the concept of the present disclosure, the scope of equivalents of the disclosed contents, and/or the scope of the technology or knowledge in the art. The embodiments are described above to provide an essential requirement for realizing the technical idea of the present disclosure, and various modifications, which are required in a particular technical field in which the present disclosure finds application and are required to use the present disclosure, may also be made to the embodiments. Therefore, the embodiments, as disclosed in detail above, of the present disclosure are not intended to impose any limitation to the present disclosure. In addition, the following claims should be construed as covering other embodiments as well.

What is claimed is:

1. A separately movable console structure comprising:
 a first console positioned underneath an armrest cover and configured to move along a console rail, wherein an insertion portion is formed inside the first console;
 a second console positioned behind the first console and configured to move along the console rail, wherein a protrusion to be inserted into the insertion portion is formed on the second console;
 a first drive unit configured to be fastened to the console rail and to apply a driving force to the first console;
 a second drive unit configured to be positioned adjacent to the first drive unit and to apply a driving force to the second console; and
 a controller connected to the first console and configured to move the first console and the second console independently of each other or to move the first console and the second console together with each other.

2. The separately movable console structure of claim 1, wherein when a swivel request signal is received and the first and second consoles are in a combined state, the controller is configured to move a seat, which is adjacent to the combined first and second consoles, away from the combined first and second consoles by a preset distance or longer.

3. The separately movable console structure of claim 1, wherein the insertion portion is configured to be opened and closed through a door portion, and the protrusion of the second console is inserted through the door portion into the insertion portion in such a manner that an end of the protrusion reaches a position adjacent to an internal surface of the insertion portion.

4. The separately movable console structure of claim 3, further comprising:
 a distance sensor unit configured to measure a separation distance between the end of the protrusion and the internal surface of the insertion portion,
 wherein the controller is configured to receive a distance signal from the distance sensor unit and to adjust a speed of the first console or the second console.

5. The separately movable console structure of claim 4, wherein the controller is configured to move the first console and the second console in a combined state in a case where the separation distance between the end of the protrusion and the internal surface of the insertion portion is below a first setting value.

6. The separately movable console structure of claim 4, wherein when the separation distance between the end of the protrusion and the internal surface of the insertion portion is equal to or greater than a first setting value, the controller is configured to determine whether or not the separation distance between the end of the protrusion and the internal surface of the insertion portion is less than a second setting value in a state where the first console and the second console are separated from each other, and
 wherein when the separation distance between the end of the protrusion and the internal surface of the insertion portion is equal to or greater than the second setting value, the controller is configured to move the first console or the second console at a first speed.

7. The separately movable console structure of claim 6, wherein when the separation distance between the end of the protrusion and the internal surface of the insertion portion is less than the second setting value, the controller is configured to move the first console or the second console at a second speed.

8. The separately movable console structure of claim 1, wherein the second console comprises a pop-up table,
   wherein when the second console have been separated from the first console and then fixed, the pop-up table is configured to be unfolded upwards.

9. The separately movable console structure of claim 1, wherein the controller is configured to move backward the first console and the second console in a combined state when receiving a door opening signal or a relaxation mode input signal from a user.

10. The separately movable console structure of claim 1, wherein the controller is configured to move the first console and the second console forward and backward, respectively, thereby spacing the first console and the second console apart, and
    wherein the controller is configured to rotate a seat when receiving a swivel mode input signal from a user.

* * * * *